United States Patent
Chen et al.

(10) Patent No.: US 9,405,381 B2
(45) Date of Patent: Aug. 2, 2016

(54) OPTICAL NAVIGATING APPARATUS AND COMPUTER READABLE MEDIA CAN PERFORM OPTICAL NAVIGATING METHOD

(71) Applicant: PixArt Imaging Inc., Hsin-Chu (TW)

(72) Inventors: Tzu-Yu Chen, Hsin-Chu (TW); Chih-Yen Wu, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 91 days.

(21) Appl. No.: 13/889,351

(22) Filed: May 8, 2013

(65) Prior Publication Data

US 2014/0098021 A1    Apr. 10, 2014

(30) Foreign Application Priority Data

Oct. 8, 2012   (TW) .............................. 101137090 A

(51) Int. Cl.
*G09G 5/00* (2006.01)
*G06F 3/03* (2006.01)

(52) U.S. Cl.
CPC ............ *G06F 3/0304* (2013.01); *G06F 3/0317* (2013.01)

(58) Field of Classification Search
CPC ........ G09G 5/08; G06F 3/0317; G06F 3/0304
USPC ......................................... 345/156, 163, 166
See application file for complete search history.

(56) References Cited

U.S. PATENT DOCUMENTS

| 6,455,840 | B1* | 9/2002 | Oliver | .................... | H04N 1/047 |
| | | | | | 250/222.1 |
| 2004/0130532 | A1* | 7/2004 | Gordon | ................. | G06F 1/3203 |
| | | | | | 345/166 |
| 2005/0110746 | A1* | 5/2005 | Hou | .............................. | 345/156 |
| 2005/0190158 | A1* | 9/2005 | Casebolt | ............... | G06F 3/0383 |
| | | | | | 345/166 |

* cited by examiner

*Primary Examiner* — Kent Chang
*Assistant Examiner* — Mark Edwards
(74) *Attorney, Agent, or Firm* — Winston Hsu; Scott Margo

(57) ABSTRACT

An optical navigating apparatus, which comprises: a light source, for illuminating a surface to generate an image; an image sensor, for catching pictures of the image; and a controller, for computing a first estimating speed of the optical navigating apparatus according to a first picture of the pictures and a second picture after the first picture. The controller controls at least one of parameters as following according to the first estimating speed: a non-illuminating frequency that the light source does not illuminate pictures after the second picture; a non-catching frequency that the image sensor does not catch pictures after the second picture; a computing frequency that the controller computes pictures after the second picture, which are caught by the image sensor; and a searching range for pictures after the second picture.

20 Claims, 6 Drawing Sheets

OPTICAL NAVIGATING APPARATUS AND COMPUTER READABLE MEDIA CAN PERFORM OPTICAL NAVIGATING METHOD

BACKGROUND OF THE INVENTION

1. Field of the Invention

The present invention relates to an optical navigating apparatus, and a computer readable recoding media that can perform an optical navigating method, and particularly relates to an optical navigating apparatus, and a computer readable recoding media that can perform an optical navigating method, which can estimate a moving speed of the optical navigating apparatus and accordingly adjusts light emitting frequency.

2. Description of the Prior Art

A prior art optical navigating apparatus utilizes a light source to illuminate a surface to generate an image. Then, an image sensor is utilized to catch pictures in an image and the pictures are computed to compute a moving speed of the optical navigating apparatus to perform tracking.

Please refer to FIG. 1, which illustrates a prior art optical mouse 100. An optical mouse is one kind of the optical navigating apparatuses. As shown in FIG. 1, the optical mouse 100 includes a light source 101, a controller 103, a image sensor 105. The light source 101, the controller 103 and the image sensor 105 are provided on a single circuit board 107. The optical mouse further includes a battery 109 to provide power to the optical mouse 100. The light source 101 illuminates a surface 102 such as the surface which the mouse is put on, to form an image. The image sensor 105 catches the pictures in the image. The controller 103 computes the speed and the acceleration of the optical mouse 100 to perform tracking operation.

Please refer to FIG. 2, which illustrates a tracking operation of the optical mouse 100 shown in FIG. 1. As shown in FIG. 2, the optical mouse continuously catches pictures and continuously performs computing operations to compute speed and acceleration of the optical mouse 100. However, in such method the power consumption is huge since the light source 101 continuously illuminates the surface 102, the image sensor continuously catches the image and the controller 103 continuously performs computing operations. Particularly, the data computing amount and the power consumption significantly increase when the optical navigating apparatus moves in a high speed mode, since a higher frequency for illuminating, image catching and computing is needed corresponding to increased difficulty for the tracking operation. A modern electronic apparatus is getting smaller thus the size of the battery 109 is limited. The stored power correspondingly decreases, thus shortage issue of power endurance for the optical navigating apparatus such as the optical mouse is caused.

SUMMARY OF THE INVENTION

Therefore, one objective of the present invention is to provide an optical navigating apparatus and an optical navigating method that can save power.

One embodiment of the present invention discloses an optical navigating apparatus, which comprises: a light source, for illuminating a surface to generate an image; an image sensor, for catching pictures of the image; and a controller, for computing a first estimating speed of the optical navigating apparatus according to a first picture of the pictures and a second picture after the first picture. The controller controls at least one of parameters as following according to the first estimating speed: a non-illuminating frequency that the light source does not illuminate pictures after the second picture; a non-catching frequency that the image sensor does not catch pictures after the second picture; a computing frequency that the controller computes pictures after the second picture, which are caught by the image sensor; and a searching range for pictures after the second picture.

Another embodiment of the present invention discloses an optical navigating apparatus, which comprises: a light source, for illuminating a surface to generate an image; an image sensor, for catching pictures of the image; and a controller, for computing a first estimating speed of the optical navigating apparatus according to a first picture of the pictures and a second picture after the first picture, and for defining a group of pictures according to the first estimating speed, wherein the group of pictures comprises a plurality of pictures that the second picture is included in. The controller controls at least one of parameters as following according to the first estimating speed: a non-illuminating frequency that the light source does not illuminate the pictures in the group of pictures; a non-catching frequency that the image sensor does not catch the pictures in the group of pictures; a computing frequency that the controller computes the pictures in the group of pictures, which are caught by the image sensor; and a searching range for the pictures in the group of pictures.

Other embodiments of the present invention provide a computer readable recording media, having at least one program code recorded thereon. An optical navigating method for an optical navigating apparatus is performed when the program code is read and executed. The optical navigating method comprise the operations of the above-mentioned optical navigating apparatus, thus it is omitted for brevity here.

In view of above-mentioned embodiments, the present invention not only can save power via adjusting the operation of the optical navigating apparatus according to the non-illuminating frequency, the non-catching frequency, and the computing frequency but also can adjust the searching range to save data computing amount to further reduce power consumption.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
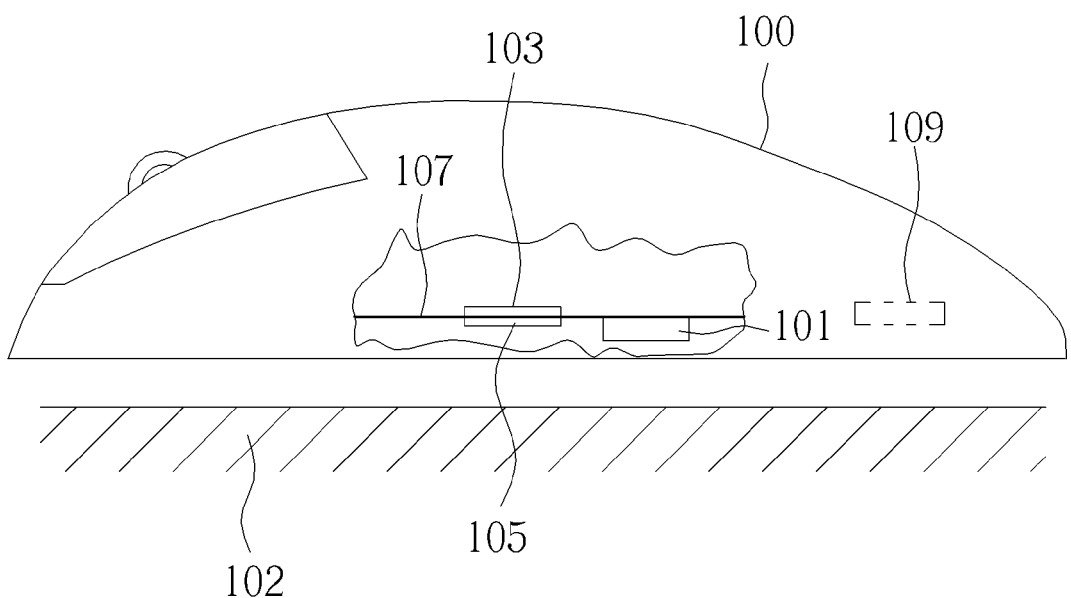
FIG. 1 illustrates a prior art optical mouse.
Figure 2:
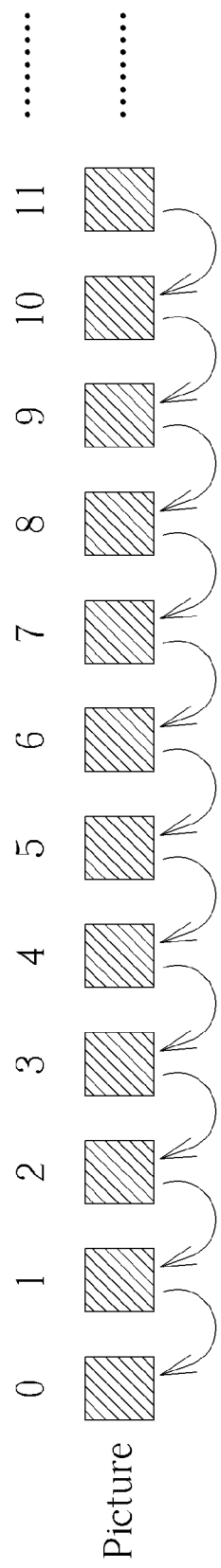
FIG. 2 illustrates a tracking operation of the optical mouse shown in FIG. 1.

The tracking operation of the optical navigating apparatus of the present invention will be described as below. It should be noted that the optical mouse 100 shown in FIG. 1 is utilized as an example to explain the tracking operation of the present invention, but it does not mean that the present invention is limited to be applied to the optical mouse 100 shown in FIG. 1. Any optical navigating apparatus comprising a light source, an image sensor and a controller for controlling the light source and the image sensor should be included in the scope of the present invention. The embodiment of the present invention also utilizes the light source 101 in the optical mouse 100 to illuminate the surface 102 to generate an image, and utilizes the image sensor 105 to catch pictures in the image. The controller 103 in FIG. 2 continuously controls the light source 101 to illuminate the surface 102 and continuously computes caught pictures. However, the controller 103 applying the embodiment of the present invention computes a first estimating speed of the optical navigating apparatus according to a first picture of the pictures and a second picture after the first picture, and determines which one of speed modes does the optical mouse 100 operate in according to the first estimating speed to define a group of pictures (GOP). The second picture can be a next picture of the first picture, or at least one picture can locate between the first picture and the second picture. The following embodiment bases on that the second picture is a next picture of the first picture, but it does not mean to limit the scope of the present invention. The GOP has a plurality of pictures including the second picture. Additionally, the controller 103 controls at least one of parameters as following according to the determined speed mode: a non-illuminating frequency that the light source 101 does not illuminate pictures after the second picture; a non-catching frequency that the image sensor 105 does not catch pictures after the second picture; a computing frequency that the controller 103 computes pictures after the second picture, which are caught by the image sensor; and a searching range for pictures after the second picture.

Figure 3:
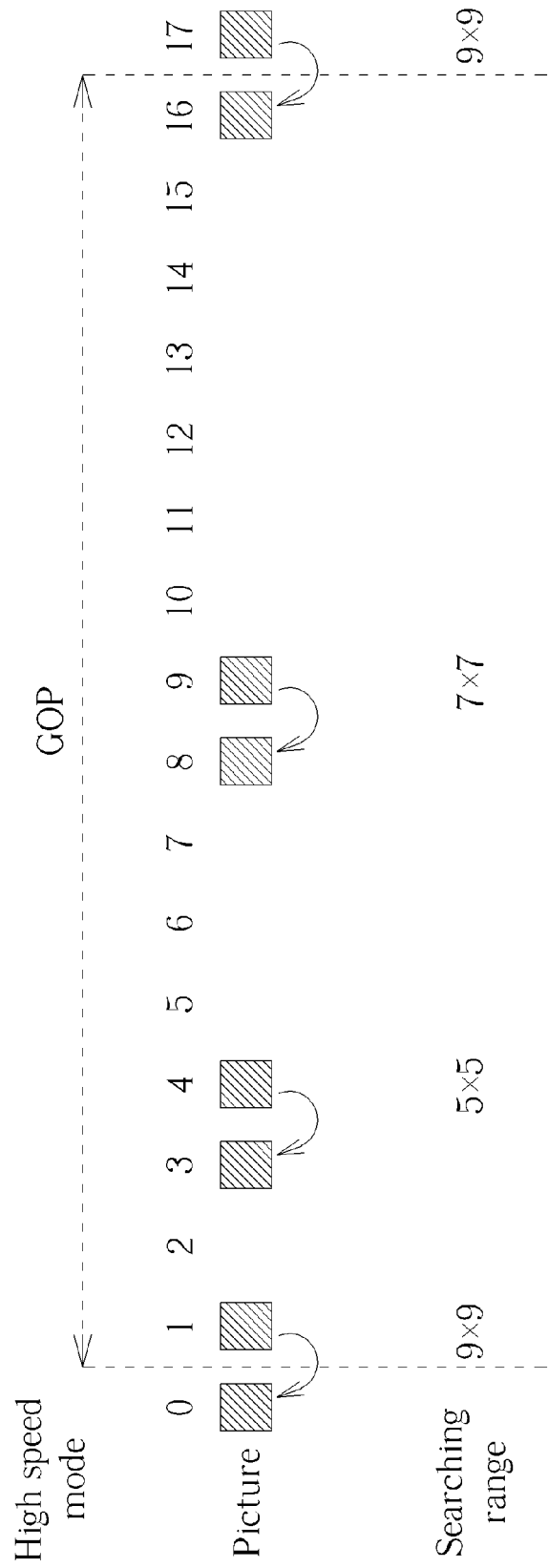
FIG. 3 is a schematic diagram illustrating a tracking operation of the optical navigating apparatus according to the present invention in a high speed mode.

In the following embodiment, the optical mouse determines which one of the high speed mode, the medium speed mode and the low speed mode does the optical mouse operate in according to the first estimating speed. Please refer to FIG. 3, which is a schematic diagram illustrating a tracking operation of the optical navigating apparatus according to the present invention in a high speed mode. In FIG. 3, the controller 103 computes a first estimating speed of the optical mouse 100 according to pictures 0 and 1 (i.e. the above-mentioned first picture and second picture). The picture 0 can be a last picture of a previous GOP. Also, the controller 103 determines that the optical mouse 100 operates in the high speed mode according to the first estimating speed, and accordingly determines a length of the GOP and the non-catching frequency. The length of the GOP indicates how many pictures are included, and the GOP includes 16 pictures in this example. Additionally, the non-catching frequency can also indicate the non-illuminating frequency. In the embodiment shown in FIG. 3, the length of the GOP is set to 16 pictures. Furthermore, it is assumed that all 16 pictures in the GOP have the speed the as the speed estimated by the pictures 0 and 1. Therefore, catching and computing for part of the pictures such as frames 2, 5-7, 10-15 can be omitted, such that the power for illuminating and computing can be reduced.

Figure 4:
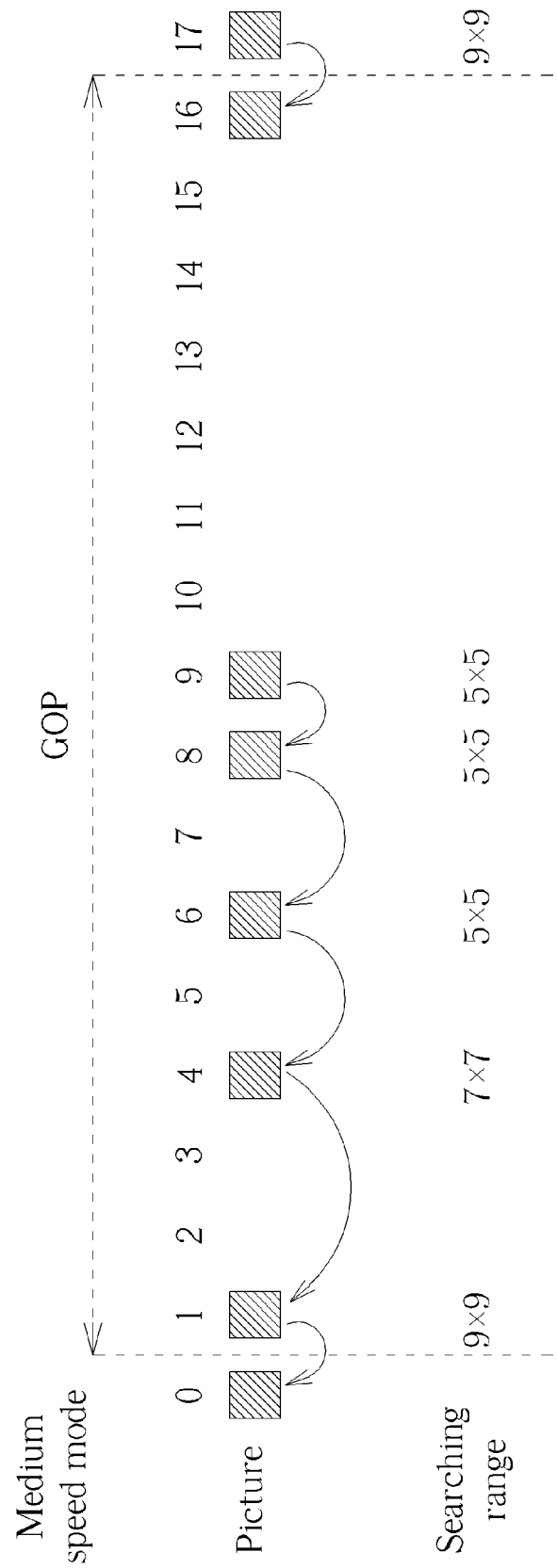
FIG. 4 is a schematic diagram illustrating a tracking operation of the optical navigating apparatus according to the present invention in a medium speed mode.

The method according to the embodiment of the present invention can follow the tendency (i.e. which one of the speed mode does the optical mouse operate in) computed according to the picture 0 and the picture 1 to process the pictures in a single GOP. However, the tendency can be updated according to part of the pictures. In FIG. 3 and FIG. 4, the curves which are between the pictures and are with arrows indicate computing operations. For example, a curve with an arrow locates between pictures 3 and 4, which means the pictures 3 and 4 are utilized for computing. In the high speed mode of FIG. 3, the speed is high but the acceleration is low, thus two continuous pictures are caught for computing (but not limited). For example, pictures 3 and 4 are computed, and pictures 8 and 9 are computed. Also, the pictures in the GOP do not need to be computed for many times to correct the tendency, since the acceleration is small. Therefore, only pictures 3/4 and 8/9 are computed in the embodiment shown in FIG. 3. Please note the speed and the acceleration acquired according to pictures in the GOPS can also be utilized to change the speed mode. For example, changing from the high speed mode to the medium speed mode, such operation will be described below. After all pictures in the GOP have been processed, the controller 103 can repeat above-mentioned operation, that is, acquire a second estimating speed according to the last picture 16 of the current GOP and a next picture 17, and then utilizes the picture 17 as a first picture of a next GOP.

If the optical mouse 100 is determined that it is in the medium speed mode according to the pictures 0 and 1, the tracking operation thereof is different from the embodiment shown in FIG. 3. FIG. 4 is a schematic diagram illustrating a tracking operation of the optical navigating apparatus according to the present invention in a medium speed mode. In the medium speed mode, it is unnecessary to catch continuous frames since the speed is low, thus the embodiment in FIG. 4 can catch non-continuous pictures 4, 6 and 8. However, the pictures in the GOP must be computed for a higher frequency to make sure the tendency computed according to the pictures 0 and 1 is correct, since the acceleration is larger. Therefore, the pictures 1, 4, 6, 8 and 9 are all utilized for computing speed there between to make sure the anticipation is correct in the embodiment shown in FIG. 4.

Figure 5:
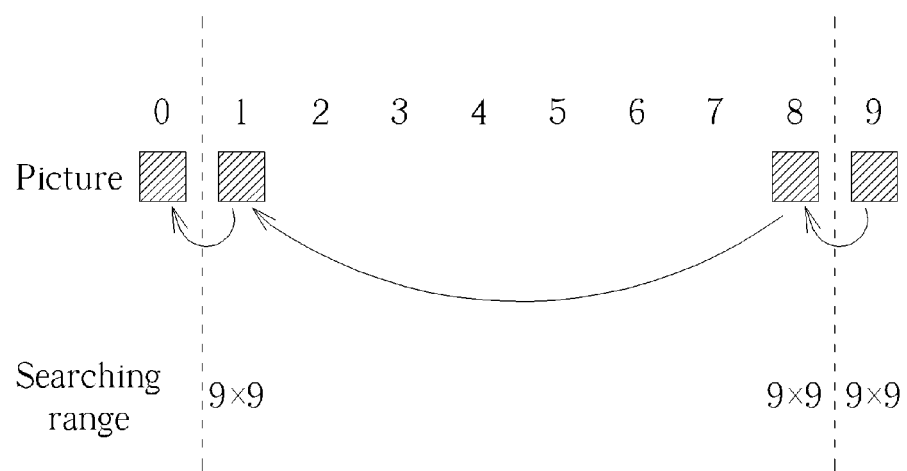
FIG. 5 is a schematic diagram illustrating a tracking operation of the optical navigating apparatus according to the present invention in a low speed mode.

If the optical mouse 100 is determined that it is in the low speed mode according to the pictures 0 and 1, the tracking operation thereof is different from the embodiment shown in FIG. 3 and FIG. 4. FIG. 5 is a schematic diagram illustrating a tracking operation of the optical navigating apparatus according to the present invention in a low speed mode. In this mode, the optical mouse 100 does not have significant movement thus the frequency for illuminating and picture catching can be decreased to a minimum level. Accordingly, only the picture 8 has been caught besides the original picture 1 in the embodiment shown in FIG. 5 to decrease power consumption for illumination. However, in order to reduce the error occurring at the timing that the pictures are not caught, the picture number of the GOP is decreased in such case. For example, the picture number of the GOP is decreased to 8 in the embodiment in FIG. 5, rather than the number 16 in FIG. 3 and FIG. 4.

Besides decreasing the frequency for catching pictures and computing, the present invention further provides concept about changing the searching range according to different speed modes. The searching range here indicates the pixel numbers included in a picture. Utilizing a picture with a larger searching range is more easily to find the tendency of the limage, but more data computing amount is needed. In the embodiment shown in FIG. 3, the pictures 0 and 1 are utilized to find a tendency and utilized to compute a speed, thus a larger searching range 9×9 (i.e. the picture is a 9×9 pixel matrix) is utilized. After the speed and the tendency are determined, it can be regarded that the picture variation is stable thus the searching range can be decreased. Therefore, the pictures 3 and 4 utilize a smaller searching range 5×5. If the pictures are not caught for a while, the tendency may change thus the searching ranges of pictures 8 and 9 are set to be 7×7.

In the embodiment shown in FIG. 4, pictures 0 and 1 both utilize a larger searching range 9×9. However, the picture 4 utilizes a large searching range 7×7 rather than the smaller one 5×5 since the tendency has large variation. The following pictures 6, 8, 9 utilize a smaller searching range 5×5 since the tendency becomes stable.

In the embodiment shown in FIG. 5, the ratio for performing above-mentioned picture catching is lower since it has few variations. Thus, the pictures 0/1 and 8/9 all utilizes a max searching range 9×9 to make sure that the tendency for the GOP can be rapidly computed while catching and computing the pictures. The above-mention searching range is only for example. Persons skilled in the art can design any size of the searching range according to above-mentioned teaching, which also falls in the scope of the present invention.

As above-mentioned, the present invention is not limited to follow the tendency computed according to the first two pictures to process other pictures in the GOP. The present invention can compute another estimating speed according to other pictures in the GOP, and then update the estimating speed. Then an acceleration can be computed according to two estimating speeds to determine if the tendency needs to be changed or a new speed mode should be utilized. Additionally, the picture number in the GOP and the frequency for catching the pictures are changed according to the determining result. Take the embodiment shown in FIG. 3 for example, another estimating speed has been acquired according to pictures 3 and 4, and the estimating speed is updated accordingly. After that, an acceleration is acquired according to the estimating speed according to the pictures 3 and 4, and the estimating speed according to the pictures 0 and 1. Then, the estimating speed and the acceleration acquired via computing pictures 3 and 4 are utilized to determine if the tendency should be changed or not. For example, if the optical mouse is determined that it should operate in a low speed mode according to the new estimating speed and the acceleration, the picture number of the GOP and the picture catching frequency are set the low speed mode shown in FIG. 5. Please note the estimating speed between the frames can be directly or non-directly computed. Take the embodiment shown in FIG. 3 for example, the speed between the pictures 1 and 4 can be directly computed according to the displacement between pictures 1 and 4, or computed according to the displacement between pictures 0 and 4.

Therefore, another aspect of the present invention does not define the GOP. Such aspect only utilizes the speed and the acceleration of the pictures to continuously update the tendency of the optical mouse, and accordingly set the non-illuminating frequency, the non-catching frequency, the computing frequency and the searching range.

Figure 6:
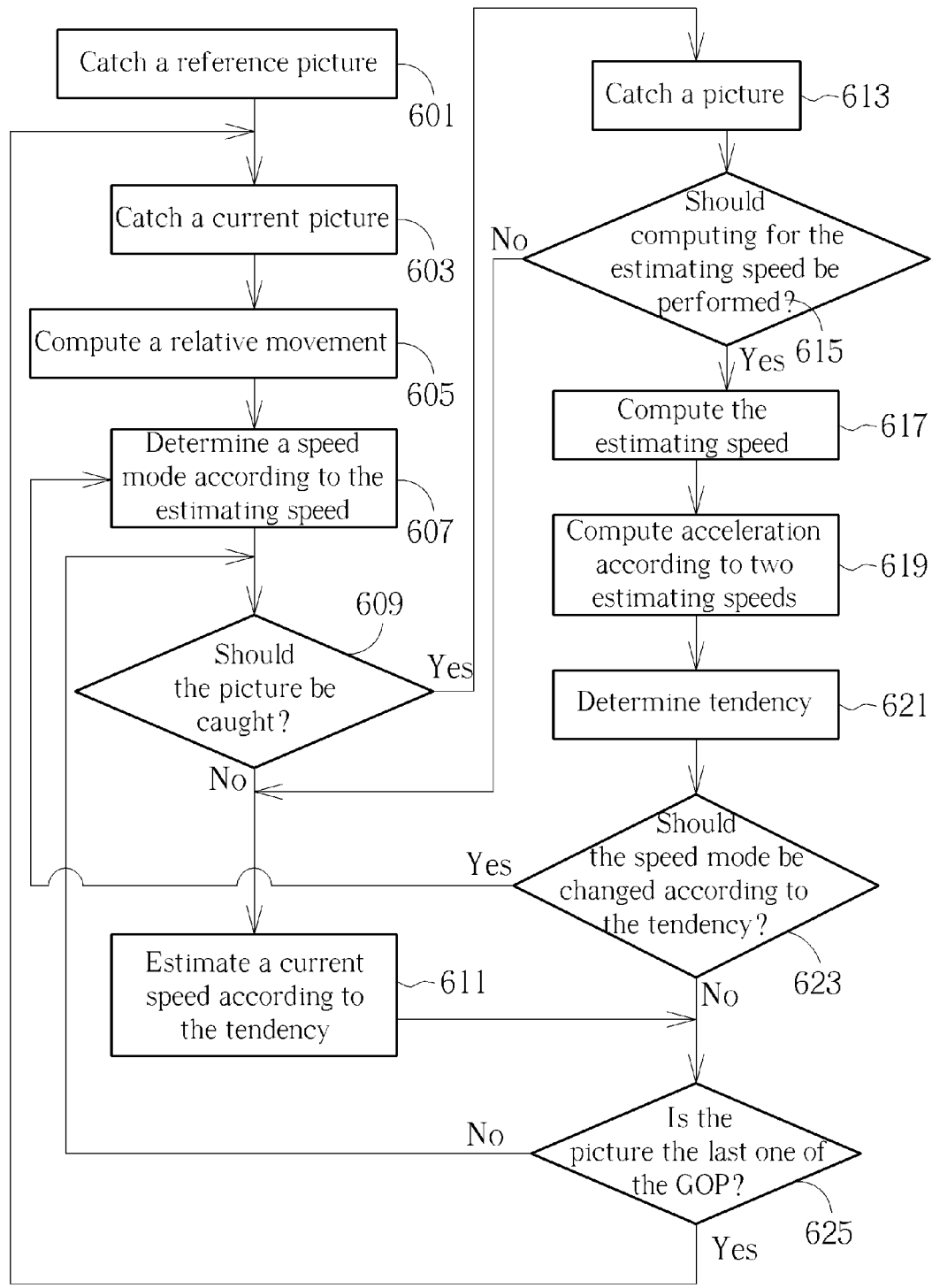
FIG. 6 is a flow chart illustrating a tracking operation of the optical navigating apparatus according to the present invention.

FIG. 6 is a flow chart illustrating a tracking operation of the optical navigating apparatus according to the present invention, which includes the following steps 601-623. The embodiment shown in FIG. 3 is utilized to explain the following steps. These steps can be applied to the embodiments shown in FIG. 4 and FIG. 5 as well.

Step 601
Catch a reference picture, such as picture 0.
Step 603
Catch a current picture, such as the picture 1.
Step 605
Compute a relative movement (i.e. compute a estimating speed).
Step 607
Determine a speed mode according to the estimating speed. That is, determine which one of the high speed mode, the medium speed mode and the low speed mode is utilized. It should be noted that the present invention is not limited to utilize these three modes. Two modes or more than three modes can be applied to this invention. Such variation should also fall in the scope of the present invention.

Step 609
Determine if the picture should be caught. If yes go to the step 613, other wise go to the step 611. The step 609 determines if the frame should be caught or not according to the speed mode determined in the step 607. For example, the picture 3 is caught in FIG. 3 but not caught in FIG. 4.

Step 611
Estimate a current speed according to the tendency. That is, utilizes the latest estimating speed as the estimating speed of the GOP. If the modes is not changed, no new speed is computed and no picture is caught after an estimating speed is computed according to pictures 0 and 1, the estimating speed according to the pictures 0 and 1 is continuously utilized as the estimating speed of the GOP. However, if a new estimating speed has been generated (ex. pictures 3 and 4), the new estimating speed is utilized as the estimating speed of the GOP.

Step 613
Catch a picture.
Step 615
Determine if computing for the estimating speed should be performed? For example, the picture in FIG. 3 is computed with the following picture 4 to compute the speed, but not with the picture 2. If not, go to step 611, if yes, go to step 617.

Step 617
Compute the estimating speed. For example, utilize pictures 3 and 4 of the GOP in FIG. 3 to re-compute the speed.
Step 619
Compute acceleration according to two estimating speeds. For example, utilize the estimating speed according to pictures 0 and 1, and the estimating speed according to pictures 3 and 4, to compute the acceleration.

Step 621
Determine tendency according to the speed and the acceleration in steps 617 and 619.
Step 623
Determine if the speed mode should be changed or not according to the tendency. If yes, go to the step 607 to reset the mode, if not, go to the step 625.

Step 625
Determine if the picture is the last one of the GOP. If yes (ex. the picture 16 in FIG. 3), go to the step 603 to catch a current picture (picture 17), if not, go to the step 609 to repeat the operations of the steps 609-623.

It should be noted that, in other embodiments, the tendency can be computed according to more than one speed and more than one accelerations rather than limited to be computed according to the second estimating speed and only one acceleration. Take the embodiment shown in FIG. 3 for example, the estimating speeds respectively according to pictures 0/1, 1/3 (or 0/3), 3/4, and the accelerations according to theses speeds can be utilized to determine tendency.

According to above-mentioned embodiments, a corresponding optical navigating method can be acquired, which can perform above-mentioned operations for the optical navigating apparatus. Such optical navigating method can be performed via at least one program code stored on a computer readable recording media (ex. hard disk, optical disk, and memory). Since the detail steps are the same as which of the above-mentioned optical navigating apparatus, thus it is omitted here for brevity.

In view of above-mentioned embodiments, the present invention not only can save power via adjusting the operation of the optical navigating apparatus according to the non-illuminating frequency, the non-catching frequency, and the computing frequency but also can adjust the searching range to save data computing amount to further reduce power consumption.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical navigating apparatus, comprising:
    a light source, for illuminating a surface to generate an image;
    an image sensor, for catching pictures of the image; and
    a controller, for computing a first estimating speed of the optical navigating apparatus according to a first picture of the pictures and a second picture after the first picture, for defining a first group of pictures according to the first estimating speed, wherein the first group of pictures comprises a plurality of pictures that the second picture is included in and has a picture number defining the number of pictures in the first group of pictures, and for determining whether a selected picture of the first group of pictures is the last picture within the first group of pictures;
    wherein the controller controls at least one of parameters as following according to the first estimating speed:
        a non-illuminating frequency that the light source does not illuminate the pictures in the first group of pictures;
        a non-catching frequency that the image sensor does not catch the pictures in the first group of pictures;
        a computing frequency that the controller computes the pictures in the first group of pictures, which are caught by the image sensor; and
        a searching range for the pictures in the first group of pictures;
        wherein the controller applies at least one of the non-illuminating frequency, the non-catching frequency, the computing frequency and the searching range, which are controlled according to the first estimating speed, to control all the pictures for the first group of pictures.

2. The optical navigating apparatus of claim 1, wherein the second picture is a next picture of the first picture.

3. The optical navigating apparatus of claim 1, wherein the picture number for the first group of pictures is proportional to the first estimating speed.

4. The optical navigating apparatus of claim 1, wherein the controller determines which one of speed modes does the optical navigating apparatus operate in according to the first estimating speed, and controls at least one of following parameters according to the speed mode determined by the controller: the picture number for the first group of pictures, the non-illuminating frequency, the non-catching frequency, the computing frequency and the searching range.

5. The optical navigating apparatus of claim 4, wherein the controller controls the non-illuminating frequency and the non-catching frequency to be inversely proportional to a speed of the optical navigating apparatus.

6. The optical navigating apparatus of claim 4, wherein the controller controls the computing frequency to be proportional to an acceleration of the optical navigating apparatus.

7. The optical navigating apparatus of claim 4, wherein the controller adjusts the searching range according to the non-illuminating frequency and the non-catching frequency.

8. The optical navigating apparatus of claim 4, wherein the controller controls the light source does not illuminate a third picture after the second picture, and controls the image sensor not to catch the third picture.

9. A non-transitory computer readable recording media, having at least one program code recorded thereon, an optical navigating method for an optical navigating apparatus is performed when the program code is read and executed, wherein the optical navigating method comprises:
    controlling a light source to illuminate a surface to generate an image;
    controlling an image sensor to catch pictures of the image;
    computing a first estimating speed of the optical navigating apparatus according to a first picture of the pictures and a second picture after the first picture;
    defining a first group of pictures according to the first estimating speed, wherein the first group of pictures comprises a plurality of pictures that the second picture is included in and has a picture number defining the number of pictures in the first group of pictures;
    determining whether a selected picture of the first group of pictures is the last picture within the first group of pictures;
    controlling at least one of parameters as following according to the first estimating speed:
        a non-illuminating frequency that the light source does not illuminate the pictures in the first group of pictures;
        a non-catching frequency that the image sensor does not catch the pictures in the first group of pictures;
        a computing frequency for computing the pictures in the first group of pictures, which are caught by the image sensor; and
        a searching range for the pictures in the first group of pictures; and
    applying at least one of the non-illuminating frequency, the non-catching frequency, the computing frequency and the searching range, which are controlled according to the first estimating speed, to control all the pictures for the first group of pictures.

10. The non-transitory computer readable recording media of claim 9, wherein the second picture is a next picture of the first picture.

11. The non-transitory computer readable recording media of claim 9, wherein the picture number for the first group of pictures is proportional to the first estimating speed.

12. The non-transitory computer readable recording media of claim 9, wherein the optical navigating method comprises:
    determining which one of speed modes does the optical navigating apparatus operate in according to the first estimating speed; and
    controlling at least one of following parameters according to the speed mode which is determined: the picture number for the first group of pictures, the non-illuminating frequency, the non-catching frequency, the computing frequency and the searching range.

13. The non-transitory computer readable recording media of claim 12, wherein the optical navigating method comprises:
    controlling the non-illuminating frequency and the non-catching frequency to be inversely proportional to a speed of the optical navigating apparatus.

14. The non-transitory computer readable recording media of claim 12, wherein the optical navigating method comprises:
    controlling the computing frequency to be proportional to an acceleration of the optical navigating apparatus.

15. The non-transitory computer readable recording media of claim 12, wherein the optical navigating method comprises:
  adjusting the searching range according to the non-illuminating frequency and the non-catching frequency.

16. The non-transitory computer readable recording media of claim 12, wherein the optical navigating method comprises:
  controlling the light source does not illuminate a third picture after the second picture, and controlling the image sensor not to catch the third picture.

17. The optical navigating apparatus of claim 1, wherein the controller further computes a second estimating speed of the optical navigating apparatus according to a third picture of the pictures and a fourth picture after the third picture, and for defining a second group of pictures according to the second estimating speed, wherein the second group of pictures comprises a plurality of pictures that the fourth picture is included in;
  wherein the controller controls at least one of parameters as following according to the second estimating speed:
    a non-illuminating frequency that the light source does not illuminate the pictures in the second group of pictures;
    a non-catching frequency that the image sensor does not catch the pictures in the second group of pictures;
    a computing frequency that the controller computes the pictures in the second group of pictures, which are caught by the image sensor; and
    a searching range for the pictures in the second group of pictures.

18. The optical navigating apparatus of claim 17, wherein the first estimating speed is higher than the second estimating speed, wherein the at least one of the non-illuminating frequency and the non-catching frequency of the first group of pictures is higher than or equals to which of the second group of pictures.

19. The non-transitory computer readable recording media of claim 9, wherein the optical navigating method further comprises:
  computing a second estimating speed of the optical navigating apparatus according to a third picture of the pictures and a fourth picture after the third picture;
  defining a second group of pictures according to the second estimating speed, wherein the second group of pictures comprises a plurality of pictures that the fourth picture is included in; and
  controlling at least one of parameters as following according to the second estimating speed:
    a non-illuminating frequency that the light source does not illuminate the pictures in the second group of pictures;
    a non-catching frequency that the image sensor does not catch the pictures in the second group of pictures;
    a computing frequency for computing the pictures in the second group of pictures, which are caught by the image sensor; and
    a searching range for the pictures in the second group of pictures.

20. The non-transitory computer readable recording media of claim 19, wherein the first estimating speed is higher than the second estimating speed, wherein the at least one of the non-illuminating frequency and the non-catching frequency of the first group of pictures is higher than or equals to the second group of pictures.

\* \* \* \* \*